Patented June 27, 1950

2,513,092

UNITED STATES PATENT OFFICE 2,513,092

PHOTOCHEMICAL PREPARATION OF BENZENE HEXACHLORIDE

Max Gonze, Forest-Brussels, Belgium, assignor to Solvay & Cie, Brussels, Belgium, a Belgian company No Drawing. Application November 6, 1947, Serial No. 784,503. In Belgium November 20, 1946

4 Claims. (Cl. 204—163)

This invention relates to the preparation of a mixture of benzene hexachlorides free from substitution products and possessing improved insecticidal properties.

According to the known processes of preparing benzene hexachloride by chlorination of benzene in the presence of light, the operation is carried out in the liquid phase or in the vapor phase at temperatures above the crystallization temperature of benzene. Under these conditions a more or less important portion of the chlorine is consumed by substitution and the reaction is accompanied by an evolution of hydrogen chloride.

In addition to the loss in chlorine and benzene, the production of substitution products has serious drawbacks. They have been held responsible for the characteristic unpleasant odor of the product obtained by these processes. Furthermore, such substitution reactions in the continuous production of benzene hexachloride give rise to serious difficulties owing to the fact that the circulating benzene must be periodically freed from the substitution products. In order to avoid the formation of these products, a process of chlorinating benzene with liquid chlorine in the absence of light has been proposed, as described in United States Patent No. 2,010,841, but an inconvenience of this process is that it requires either the use of pressure, or the maintenance of a temperature lower than −34° C., this being the boiling point of chlorine at atmospheric pressure.

The object of the present invention is to obtain benzene hexachloride free from substitution products and to avoid the above inconveniences. This is attained according to this invention by carrying out the chlorination in the presence of light, in an inert solvent containing the benzene dissolved therein, and at a temperature between the crystallizing temperature of benzene (+6° C.) and the crystallization temperature of its mixture with said solvent.

As an inert solvent, I preferably use carbon tetrachloride, which forms with benzene an eutectic mixture containing 15% of $C_6H_6$ and having a solidification point of about −47° C. In practice I may use a mixture, the benzene concentration of which is lower than or equal to saturation at the operating temperature.

The invention is not limited to the use, as solvents, of products saturated with chlorine but it also applies to any solvent for benzene that is indifferent with respect to chlorine under the operating conditions of the process.

In discontinuous operation, crystals of $CCl_4$ may appear when, in the production of $C_6H_6Cl_6$, the solution becomes exhausted in benzene and supersaturated with $CCl_4$. This however will seldom occur as the solubilities of benzene hexachlorides are such that the crystals of $C_6H_6Cl_6$ will appear before the crystals of $CCl_4$. However in order to preclude this phenomenon and also to maintain constant the concentration of the dissolved benzene, it is recommended that a mixture be used in which this concentration is greater than that corresponding to saturation at operating temperature. In that case, the crystals of benzene in suspension form a reserve and dissolve in proportion to the formation of benzene hexachloride. If this reserve is judiciously determined, there will remain in suspension at the end of the chlorination only crystals of $C_6H_6Cl_6$.

Example 1

In a receptacle containing no selective catalyst for substitution reactions, 300 gr. of a mixture containing 70% $CCl_4$ and 30% benzene are introduced. The mixture is cooled to −20° C. and $CO_2$ is blown thereinto. The reactor is lighted by a mercury vapor lamp and in 40 minutes 84 gr. of chlorine gas are introduced in the form of a gaseous mixture containing 10% $CO_2$.

The coloring due to dissolved chlorine disappears from the very beginning of the operation. No evolution of HCl is observed and the final product of chlorination is neutral. By separation by means of water vapor, a mixture of benzene hexachloride isomers is obtained that is free from odor and possesses remarkable insecticidal properties.

The process can easily be carried out continuously by operating in a manner similar to that described in my co-pending patent application Ser. No. 692,722 filed August 23, 1946.

Example 2

In a liquid mixture of benzene and solvent saturated with benzene hexachloride at −40° C. and lighted by a mercury vapor lamp, there is injected at −20° C. benzene and chlorine gas in stoichiometric amounts until the solution is saturated at −20° C. The solution then flows into a decanter-crystallizer cooled at −40° C. where the crystals formed are separated and the solution is returned integrally to the chlorinating apparatus. The total absence of substitution reactions makes it possible to dispense with the purification operations necessary in previous processes.

When a particularly well de-odorized product is desired it is recommended that the benzene be carefully purified before use as specified in my co-pending patent application Ser. No. 734,239 filed March 12, 1947. For the same purpose and for uniform reaction, it is advisable to operate in the complete absence of oxygen both in the gas chamber and with respect to the materials used for carrying out the reaction.

I claim:

1. In a process of preparing benzene hexachloride by chlorination of benzene with chlorine gas, dissolving benzene in an organic solvent of the aliphatic series which is liquid at 6° C. and is substantially indifferent to chlorine under operating conditions, and carrying out the chlorination under irradiation by light at a temperature between 6° C. and the crystallizating temperature of the solution of benzene in said solvent.

2. In a process of preparing benzene hexachloride by chlorination of benzene with chlorine gas, dissolving benzene in carbon tetrachloride, and carrying out the chlorination under irradiation by light at a temperature between 6° C. and the crystallizing temperature of the solution of benzene in said carbon tetrachloride.

3. In a process as defined in claim 1, maintaining benzene crystals in suspension in the solution whereby said benzene crystals will dissolve gradually in said solution as the dissolved benzene is transformed into benzene hexachloride, thereby maintaining in the solution as high a benzene concentration as possible.

4. In a process as defined in claim 1, continuously introducing into the mixture of benzene and solvent saturated with $C_6H_6Cl_6$ stoichiometric amounts of chlorine and fresh benzene, separating the crystals of $C_6H_6Cl_6$ and returning the mother liquor to the chlorination.

MAX GONZE.

REFERENCES CITED

The following references are of record in the file of this patent:

UNITED STATES PATENTS

| Number | Name | Date |
|---|---|---|
| 2,010,841 | Bender | Aug. 13, 1935 |
| 2,218,148 | Hardie | Oct. 15, 1940 |
| 2,438,900 | Cooke et al. | Apr. 6, 1948 |

FOREIGN PATENTS

| Number | Country | Date |
|---|---|---|
| 504,569 | Great Britain | Oct. 26, 1938 |

OTHER REFERENCES

Slade, Chemistry and Industry, Oct. 13, 1945, pp. 314–319.